(12) United States Patent
St. Clair (10) Patent No.: US 8,875,253 B2
(45) Date of Patent: Oct. 28, 2014

(54) TRUST METRICS ON SHARED COMPUTERS

(75) Inventor: Luke St. Clair, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/541,244

(22) Filed: Jul. 3, 2012

(65) Prior Publication Data

US 2014/0013404 A1 Jan. 9, 2014

(51) Int. Cl.
*H04L 12/58* (2006.01)

(52) U.S. Cl.
CPC .............. *H04L 12/588* (2013.01); *H04L 51/32* (2013.01)
USPC ........................................................... 726/5

(58) Field of Classification Search
CPC ..... H04L 12/588; H04L 51/32; H04W 4/206; G06Q 50/01; H04N 21/4788
USPC ........................................................... 726/5
See application file for complete search history.

(56) References Cited

U.S. PATENT DOCUMENTS

| | | | |
|---|---|---|---|
| 8,554,635 B2* | 10/2013 | England et al. | 705/26.1 |
| 2004/0015573 A1 | 1/2004 | Yuki | |
| 2008/0086529 A1 | 4/2008 | Lu | |
| 2008/0236902 A1 | 10/2008 | Imaizumi | |
| 2009/0055925 A1 | 2/2009 | Masui | |
| 2009/0282473 A1 | 11/2009 | Karlson | |
| 2010/0323644 A1 | 12/2010 | Bataille | |
| 2010/0323664 A1* | 12/2010 | Sivaram et al. | 455/411 |
| 2011/0022657 A1* | 1/2011 | Zhu et al. | 709/204 |
| 2011/0191417 A1* | 8/2011 | Rathod | 709/204 |
| 2011/0239133 A1* | 9/2011 | Duffus et al. | 715/753 |
| 2011/0258303 A1* | 10/2011 | Nath et al. | 709/223 |
| 2011/0264736 A1* | 10/2011 | Zuckerberg et al. | 709/204 |
| 2011/0314017 A1* | 12/2011 | Yariv et al. | 707/737 |
| 2012/0023417 A1* | 1/2012 | Nesladek et al. | 715/753 |
| 2012/0158589 A1* | 6/2012 | Katzin et al. | 705/44 |
| 2012/0166553 A1* | 6/2012 | Rubinstein et al. | 709/206 |
| 2012/0294495 A1* | 11/2012 | Wren et al. | 382/118 |
| 2012/0317109 A1* | 12/2012 | Richter et al. | 707/734 |
| 2013/0007126 A1* | 1/2013 | Ziemann | 709/204 |
| 2013/0036164 A1* | 2/2013 | Carduner et al. | 709/204 |
| 2013/0066967 A1* | 3/2013 | Alexander | 709/204 |
| 2013/0073983 A1* | 3/2013 | Rasmussen et al. | 715/753 |
| 2013/0091582 A1* | 4/2013 | Chen et al. | 726/26 |
| 2013/0173712 A1* | 7/2013 | Monjas Llorente et al. | 709/204 |
| 2013/0185426 A1* | 7/2013 | Chevillat | 709/225 |
| 2013/0198274 A1* | 8/2013 | Papakipos et al. | 709/204 |
| 2013/0246454 A1* | 9/2013 | Menten | 707/769 |
| 2014/0006494 A1* | 1/2014 | George | 709/204 |

OTHER PUBLICATIONS

Office Action for U.S. Appl. No. 13/541,212, Apr. 25, 2013.
U.S. Appl. No. 13/541,212, filed Jul. 3, 2012, St. Clair.

* cited by examiner

*Primary Examiner* — Techane Gergiso
(74) *Attorney, Agent, or Firm* — Baker Botts L.L.P.

(57) ABSTRACT

In one embodiment, a method includes receiving data uniquely identifying a particular user to the verification authority and a request to access a shared device. The shared device being configured for use by at least a number of users. The method also includes accessing a social graph of the particular user to determine whether one or more users in the social graph have previously accessed the shared device; and displaying on a display of the mobile device information indicating which of the users in the social graph have previously accessed the shared device.

20 Claims, 6 Drawing Sheets

TRUST METRICS ON SHARED COMPUTERS

TECHNICAL FIELD

This disclosure generally relates to shared computing resources.

BACKGROUND

A mobile electronic device, such as a smartphone, tablet device, laptop computer, etc., has general computing capabilities. The mobile electronic device may execute one or more applications such as for example, communications through short-message service (SMS), communications through multimedia-messaging service (MMS), accessing e-mail, accessing Internet content, communications through a short-range wireless (e.g. infrared or BLUETOOTH), business applications, gaming, or photography using a camera integrated into the mobile electronic device. A smartphone is a particular class of mobile electronic device with telephony capabilities provided through a radio-frequency (RF) communication link whilst moving within a geographic area. The smartphone may have a touch sensor integrated with a display screen, where the touch sensor detects touch inputs and the display screen displays content. The smartphone connects to a cellular network for access to the public telephone network and Internet content.

DESCRIPTION OF EXAMPLE EMBODIMENTS

Figure 1:
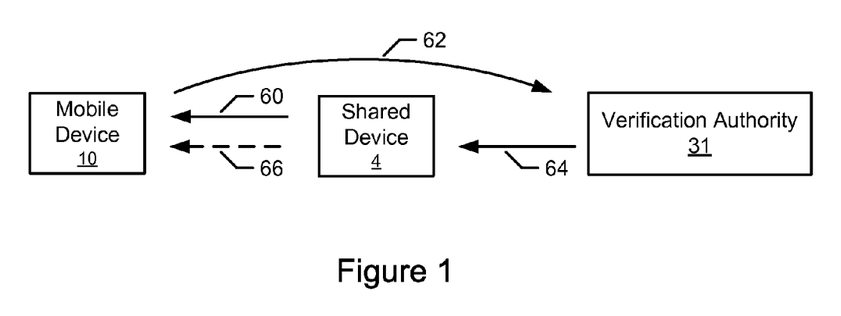
FIG. 1 illustrates example interactions for an example mobile-device-based trust computing system.

FIG. 1 illustrates example interactions for an example mobile-device-based trust computing system. In the example of FIG. 1, the example mobile-device-based trust computing system includes mobile device 10, shared device 4, and verification authority 31. In particular embodiments, mobile device 10 is associated with a particular user. In particular embodiments, verification authority 31 may perform an authentication procedure allowing a user to access shared device 4 or the system that includes verification authority 31 through shared device 4. As an example and not by way of limitation, verification authority 31 is a social-networking system and access to shared device 4 is controlled by a webpage hosted by the social-networking system. In particular embodiments, the user may perform an authentication procedure to access a service hosted by verification authority 31 through shared device 4 using mobile device 10. Herein, reference to a verification authority may encompass both the authentication component and the Internet entity providing a service to the user such as for example a social-networking system, a financial institution, or a web portal, where appropriate. Alternatively, where appropriate, reference to a verification authority may encompass authentication component, but not the Internet entity hosting the authentication component.

As part of the trust-based authentication procedure, the user may receive authentication data associated with shared device 4, as illustrated by interaction 60 in FIG. 1. In particular embodiments, an application ("app") on mobile device 10 obtains the authentication data from shared device 4. As an example and not by way of limitation, the application on mobile device 10 may capture an image of a quick-response (QR) code presented on a display of shared device 4 and transmit authentication data encoded in the QR code to verification authority 31. As another example, the application executed on mobile device 10 may receive the authentication data from shared device 4 through a wireless protocol, such as for example, BLUETOOTH or WI-FI. As another example, the display of shared device 4 may present the authentication data, e.g. an alphanumeric verification code, that is manually input into mobile device 10 for transmission to verification authority 31. In particular embodiments, the authentication data from shared device 4 originates from verification authority 31 and is provided to the application on mobile device 10 through shared device 4.

In particular embodiments, verification authority 31 may authenticate mobile device 10, shared device 4, or any combination of shared device 4 and mobile devices 10 through the access data transmitted by the application on mobile device 10, as illustrated by interaction 62 in FIG. 1. In particular embodiments, the access data transmitted to verification authority 31 includes a digital credential associated with mobile device 10 and the authentication data associated with shared device 4 that function as a signed digital certificate. As an example and not by way of limitation, the digital credential may include an authentication cookie installed on mobile device 10 when initially accessing verification authority 31 through mobile device 10. The authentication cookie uniquely identifies mobile device 10 or the user to verification authority 31.

In particular embodiments, verification authority 31 authenticates the access data, that includes authentication data associated with shared device 4 and the digital credential associated with mobile device 10, transmitted by the application on mobile device 10. Verification authority 31 may compare the access data with verification data associated with shared device 4 and mobile device 10 stored on verification authority 31. As an example and not by way of limitation, the authentication manager of a social-networking system may act as the verification authority 31 and may compare the authentication data associated with shared device 4 and transmitted by mobile device 10 with the verification data stored on the social-networking system. As another example, the social-networking system may compare information in the authentication cookie transmitted by mobile device 10 with the verification data stored on the social-networking system.

Verification authority 31 may transmit a signed digital certificate to shared device 4 in response to authenticating the access data, as illustrated by interaction 64 of FIG. 1. The user of mobile device 10 is allowed to access shared device 4 in response to shared device 4 receiving the signed digital certificate from verification authority 31. Access to shared device 4 is achieved without providing information of the user to shared device 4. In particular embodiments, shared device 4 is a computer located at a publically accessible location such as for example, an Internet café or a public library. In other particular embodiments, shared device 4 is a wireless router of a publically accessible WI-FI hotspot. In particular embodiments, shared device 4 in turn may sign the digital certificate signed by verification authority 31 and transmit the digital certificate signed by both shared device 4 and verification authority 31 to the application of mobile device 10 for an additional level of assurance, as illustrated by interaction 66 of FIG. 1. In particular embodiments, based on authentication of the user on shared device 4 through mobile device 10, verification authority 31 may restore the last saved state associated with the user on a service hosted by verification authority 31 on shared device 4. As an example and not by way of limitation, verification authority 31 may restore a last saved state of a web browser executed on shared device 4.

In particular embodiments, verification authority 31 may establish a trust metric for mobile device 10 or shared device 4. System-state or configuration information of mobile device 10 may be transmitted to verification authority 31. As an example and not by way of limitation, mobile device 10 may include a trusted-platform module (TPM) that provides system-state information detailing the configuration of mobile device 10 and including data that indicates which applications are installed on mobile device 10. Moreover, verification authority 31 may access an application store, such as for example GOOGLE PLAY or APP STORE, to obtain a unique signature for each application installed on mobile device 10 according to the system-state data. In particular embodiments, the system-state information of mobile device 10 may be used to provide a trust metric for mobile device 10. As an example and not by way of limitation, the authentication manager of social-networking system 30 may compare the information provided by the TPM of mobile device 10 with the unique signatures of the applications installed on mobile device 10. In particular embodiments, a discrepancy between the system-state information and the signatures of the applications installed on mobile device 10 may indicate mobile device 10 has been compromised. A compromised mobile device 10 may be denied access to a service hosted by verification authority 31 or to shared device 4.

In particular embodiments, shared device 4 is registered with verification authority 31. In particular embodiments, verification authority 31 may scan shared device 4 to detect the presence of viruses or malware on shared device 4. Moreover, verification authority 31 may determine the configuration of shared device 4 including such as for example, the installed software and the versions of the software, operating system, or security patches, that are installed on shared device 4. In particular embodiments, verification authority 31 may collect statistics on the effectiveness of different anti-virus software by tracking the anti-virus software installed on shared device 4 and other devices registered with verification authority 31 and the number of viruses or malware found on those devices.

Verification authority 31 may provide a trust-based metric on mobile device 10 of the user indicating the "trustworthiness" of shared device 4. In particular embodiments, prior to accessing shared device 4, a social-networking system acting as a verification authority 31 may access the social graph and action store to determine if other users in the social graph of the user of mobile device 10 have previously accessed shared device 4. As described below, the social graph stores connections each user has with other users of a social-networking system and the action store stores actions that have been performed by the users of the social-networking system. In particular embodiments, verification authority 31 may transmit one or more names and/or images of other users of the social graph (e.g. as a "facepile") who have previously accessed shared device 10. In particular embodiments, verification authority 31 may present a trust-based metric for shared device 4 based on the number of other users in the social graph of the user who have previously accessed shared device 4 and subsequently had their account on a service hosted by verification authority 31 compromised. As described below, the social graph of the user may include information of connections the user has with other users of an online service. In particular embodiments, the social graph may also include information of second-order connections, thereby forming a non-extended or extended social graph based at least in part on whether the other users or nodes have direct or indirect connection respectively with the user. In particular embodiments, the trust-based metric may include data from the extended social graph of the user to include users who are not directly connected to the user of mobile device 10. As an example and not by way of limitation, data from the extended social graph in cases where the amount of data available from the non-extended social graph is too small to generate a meaningful trust-based metric. As an example and not by way of limitation, verification authority 31 may determine an account is compromised based on whether the user reset their account password subsequent to accessing shared device 10 within a pre-determined period of time.

In particular embodiments, the names and/or images of users in the social graph and the trust-based metric may be displayed on the display of mobile device 10 and the user may decide whether to proceed with accessing shared device 4. Although this disclosure describes a particular trust-based metric that includes particular elements, this disclosure contemplates a trust-based metric that includes any suitable elements, such as for example numerical or graphical data, or a natural language message. As an example and not by way of limitation, verification authority 31 may present a message stating "13 of your friends have used this machine without issue." As another example, verification authority 31 may provide a pie chart indicating a number of users in the social graph that had an issue with their account subsequent to accessing shared device 4 out of the total number of users in the social graph that accessed shared device 4.

Figure 2:
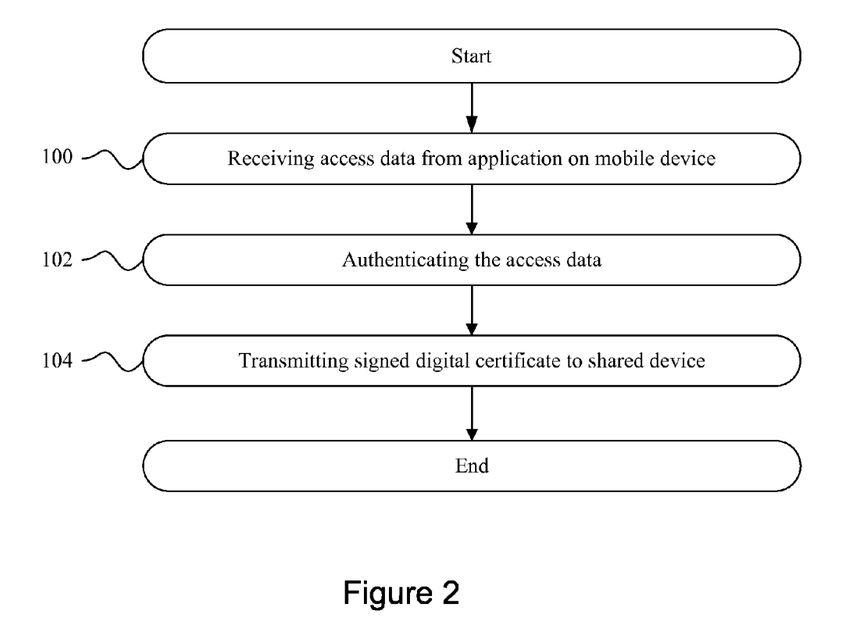
FIG. 2 illustrates an example method for mobile-device-based trust computing.

FIG. 2 illustrates an example method for mobile-device-based trust computing. The method may start at step 100, where a verification authority receives access data from an application on a mobile device of a user. The access data may include authentication data associated with a shared device and a digital credential associated with the mobile device. At step 102, the verification authority authenticates the access data based on a comparison of the access data with verification data stored by the verification authority. In particular embodiments, the digital credential associated with the mobile device may be an authentication cookie installed on the mobile device. In other particular embodiments, the authentication data associated with the shared device is encoded in a QR code generated by the verification authority and displayed on a display of the shared device. At step 104, the verification authority signs and transmits the signed digital certificate to the shared device in response to the authentication, at which point the method may end. The signed digital certificate provides the user access to the shared device. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components carrying out particular steps of the method of FIG. 2, this disclosure contemplates any suitable combination of any suitable components carrying out any suitable steps of the method of FIG. 2.

Figure 3:
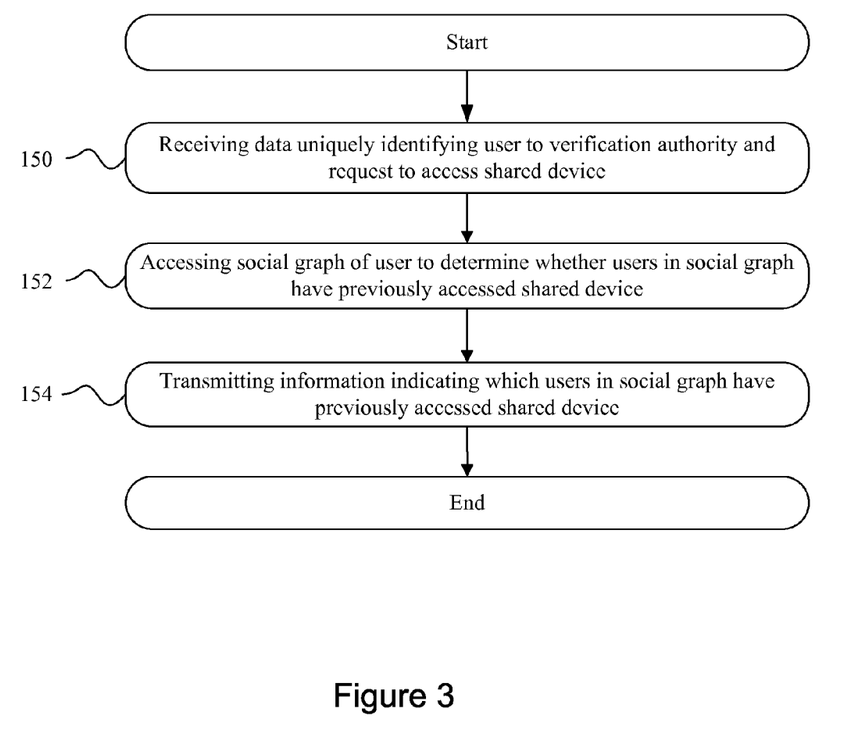
FIG. 3 illustrates an example method for determining a trust metric for a shared devices by a verification authority.

FIG. 3 illustrates an example method for determining a trust metric for a shared device by a verification authority. The method may start at step 150, where a verification authority receives data uniquely identifying a particular user to the verification authority and a request to access a shared device. As described above, the shared device is configured for use by multiple users. At step 152, the verification authority accesses a social graph of the particular user to determine whether one or more users in the social graph have previously accessed the shared device. At step 154, the verification authority transmits information indicating which of the users in the social graph have previously accessed the shared device on a display of the mobile device, at which point the method may end. In particular embodiments, the information transmitted by the verification authority may be one or more names and/or images of other users of the social graph who have previously accessed shared device. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
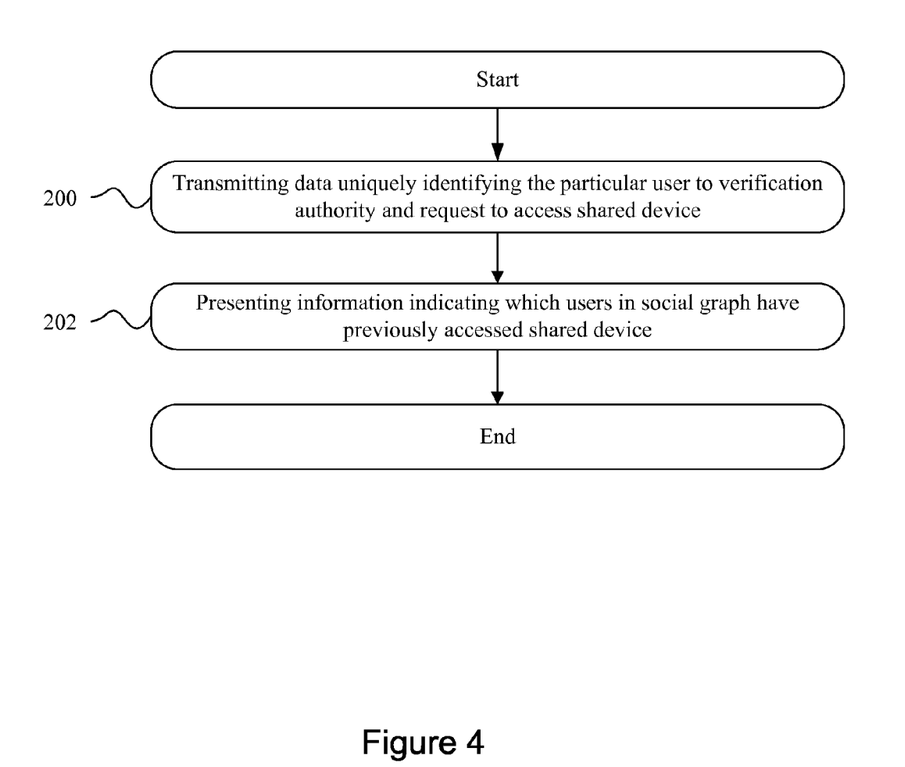
FIG. 4 illustrates an example method for presenting a trust metric for a shared device on a mobile device.

FIG. 4 illustrates an example method for presenting on a mobile device trust-based information for a particular shared device. The method may start at step 200, where an application on a mobile device of a particular user transmits data uniquely identifying the particular user to a verification authority and a request to access a shared device. In particular embodiments, the shared device is located at an Internet café or a public library. At step 202, the application on the mobile device presents on a display information from the verification authority indicating which users in a social graph of the particular user have previously accessed the shared device, at which point the method may end. As described above, the verification authority may access the social graph of the particular user to determine whether the users in the social graph have previously accessed the shared device. In particular embodiments, the trust-based metric may indicate a number of the users in the social graph that had an account compromised subsequent to accessing the shared device. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
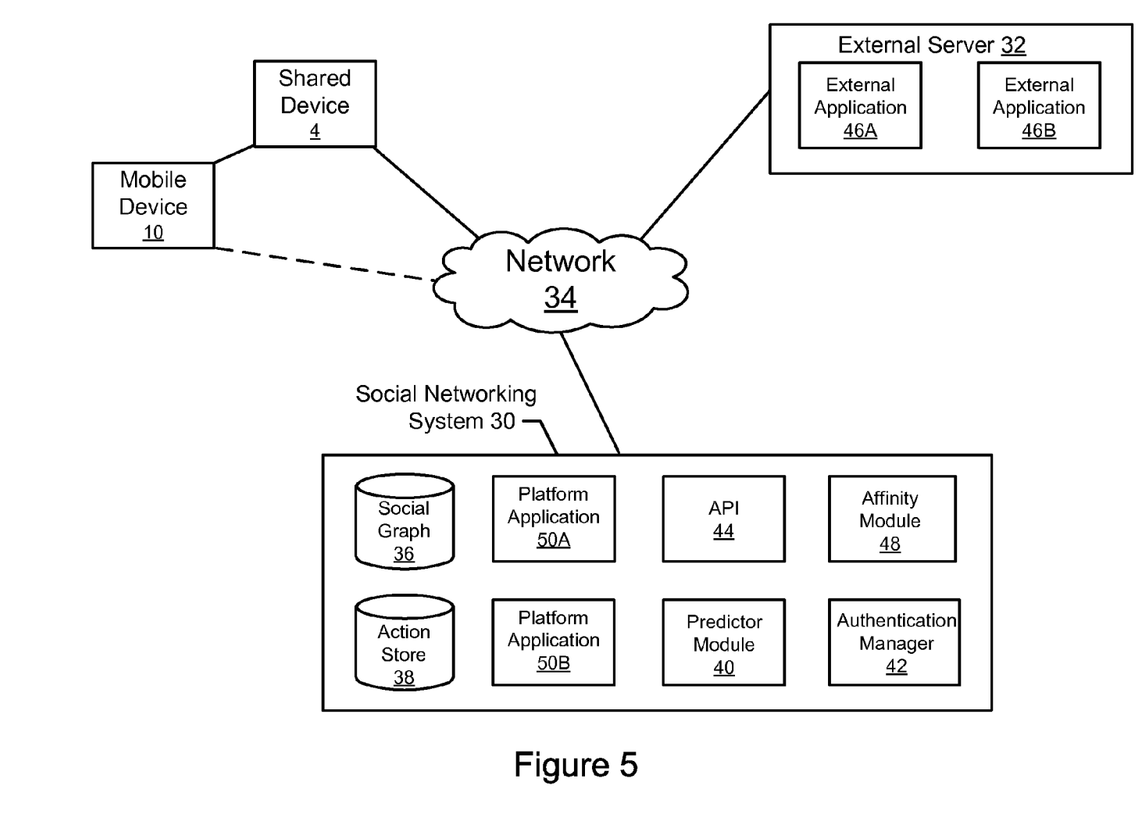
FIG. 5 illustrates an example social-networking system.

FIG. 5 illustrates an example social-networking system. In particular embodiments, authentication manager 42 in conjunction with one or more external applications 46A-B or platform applications 50A-B of social-networking system 30 may act as the verification authority 31 described above. In other particular embodiments, the verification authority may access data stored in social graph 36 and action store 38. In the example of FIG. 5, a social-networking system 30 and an external server 32 are coupled through a network 34. Network 34 generally represents a network or collection of networks (such as for example the Internet, a corporate intranet, a virtual private network (VPN), a local-area network (LAN), a wireless local-area network (WLAN), a cellular network, a wide-area network (WAN), a metropolitan-area network (MAN), or a combination of two or more such networks) over which social-networking system 30 or external server 32 may communicate with shared device 4 and mobile device 10.

A user may interact with social-networking system 30 using shared device 4 in conjunction with mobile device 10. Shared device 4 and mobile device 10 may communicate with social-networking system 30 via an application such as a web browser or native application executed on processor of shared device 4 and mobile device 10. As an example and not by way of limitation, interactions between shared device 10 and social-networking system 30 may include viewing profiles of other users of social-networking system 30, contributing and interacting with media items, joining groups, listing and confirming attendance at events, checking in at locations, liking certain pages, creating pages, and performing other tasks that facilitate social interaction. In particular embodiments, shared device 4 may be a publically accessible computing resource, such as for example a shared computer at an Internet café or public library, and mobile device 10 may be a smartphone, as described above. In other particular embodiments, shared device 4 may be a virtualized computing resource or a WI-FI or other wireless access point in addition to or instead of a shared computer. Although this disclosure describes and illustrates particular interactions between particular devices and the example social-networking system, this disclosure contemplates any suitable interactions between any suitable devices and any suitable system.

Social-networking system 30 includes components used to store information about users and objects represented in the social networking environment and relationships among the users and objects. The social-networking system 30 may include components enabling interactions with shared device 4 or mobile device 10, as described below. Components of social-networking system 30 may be hosted on one or more servers. This disclosure contemplates any suitable servers, such as servers that are internal to social-networking system 30 or external servers 32. As an example and not by way of limitation, one or more servers may each include one or more advertising servers, applications servers, catalog servers, communications servers, database servers, exchange servers, fax servers, file servers, game servers, home servers, mail servers, message servers, news servers, name or domain-name servers (DNS), print servers, proxy servers, sound servers, standalone servers, web servers, or web-feed servers. In particular embodiments, a server includes hardware, software, or both for providing the functionality of the server. As an example and not by way of limitation, a server that operates as a web server may be capable of hosting websites containing web pages or elements of web pages and include appropriate hardware, software, or both for doing so. In particular embodiments, a web server may host Hyper Text Markup Language (HTML) or other suitable files or dynamically create or constitute files for web pages on request. In response to a Hyper Text Transfer Protocol (HTTP) or other request from shared device 4 or mobile device 10, the web server may communicate one or more such files to mobile device 10. As another example, a server that operates as a database server may be capable of providing an interface for interacting with one or more data stores (such as, for example, action store 38 described below). Where appropriate, a server may include one or more servers; be unitary or distributed; span multiple locations; span multiple machines; span multiple datacenters; or reside in a cloud, which may include one or more cloud components in one or more networks.

A social graph 36 of social-networking system 30 stores the connections each user has with other users of social-networking system 30. In particular embodiments, social graph 36 may also store second-order connections. The connections may thus be direct or indirect. As an example and not by way of limitation, if user A is a first-order connection of user B but not of user C, and B is a first-order connection of C, then C is a second-order connection of A on social graph 36. An action store 38 stores actions that have been performed by the users of social-networking system 30, along with an indication of the time associated with those actions and references to any objects related to the actions. Action store 38 may store statistics for specified categories of actions. As an example and not by way of limitation, for a given user, action store 38 may contain a number of stories posted in 30 days by a user, a number of photos posted by the user in 30 days, or a number of distinct users that received comments of the user within the past 30 days. For a given connection between two users, user A and user B, action store 38 may contain actions such as the number of profile page views from user A to user B, the number of photo page views from user A to user B, and the number of times user A and user B were tagged in the same photo, and these actions may be associated with a timestamp or may be filtered by a cutoff (e.g., 24 hours, 90 days, etc.). The actions recorded in action store 38 may be farmed actions, which are performed by a user in response to the social-networking system 30 providing suggested choices of actions to the user.

A predictor module 40 is responsible for computing a set predictor functions that predict whether a user will perform a set of corresponding actions. Each predictor function may be representative of a user's interest in a particular action associated with the predictor function. The historical activity of a user may be used as a signal of a user's future interest in the same activity. In particular embodiments, the predictor function is generated using a machine-learned algorithm, that is trained using a user's historical activity associated with an action. Predictor module 40 thus provides a predictor function for each of a set of actions, where a predictor function may take as an input the a user's historical activity and then outputs a measure of the likelihood that the user will engage in the corresponding activity.

An authentication manager 42 may allow users to log into social-networking system 30 from mobile device 10 or shared device 4 through an application supporting social-networking system 30. An application programming interface (API) 44 works in conjunction with authentication manager 40 to validate users via external applications 46A-B stored on external server 32. In particular embodiments, authentication manager 42 in conjunction with API 44 may periodically verify account information of the user.

An affinity module 48 provides a measure of affinity based on input data about the user from the social-networking system 30 using the predictor functions. Various processes may request a measure of affinity from affinity module 48. As an example and not by way of limitation, the processes may include basic social-networking system functionality, such as for example newsfeed algorithms, advertising-targeting algorithms, or friend-suggestion algorithms. Other processes that request measures of affinity may be executed by one or more platform applications 50A-B, which are applications that operate within the social-networking system 30 but may be provided by third parties other than an operator of the social-networking system 30. Platform applications 50A-B may include social games, messaging services, or any suitable application that uses the social platform provided by social-networking system 30.

In particular embodiments, the processes requesting a measure of affinity for a user may include one or more external applications 46A-B executed on external server 32. External applications 46A-B may interact with the social-networking system 30 via API 44. External applications 46A-B can perform various operations supported by the API 44, such as enabling users to send each other messages or SMS messages through social-networking system 30 or showing advertisements routed through social-networking system 30. Herein, reference to SMS messages encompasses messages in text and other forms of content, such as for example, images or links to web content. Although this disclosure describes and illustrates a particular social-networking system having a particular configuration of particular components, this disclosure contemplates a social-networking system having any suitable configuration of any suitable components.

Figure 6:
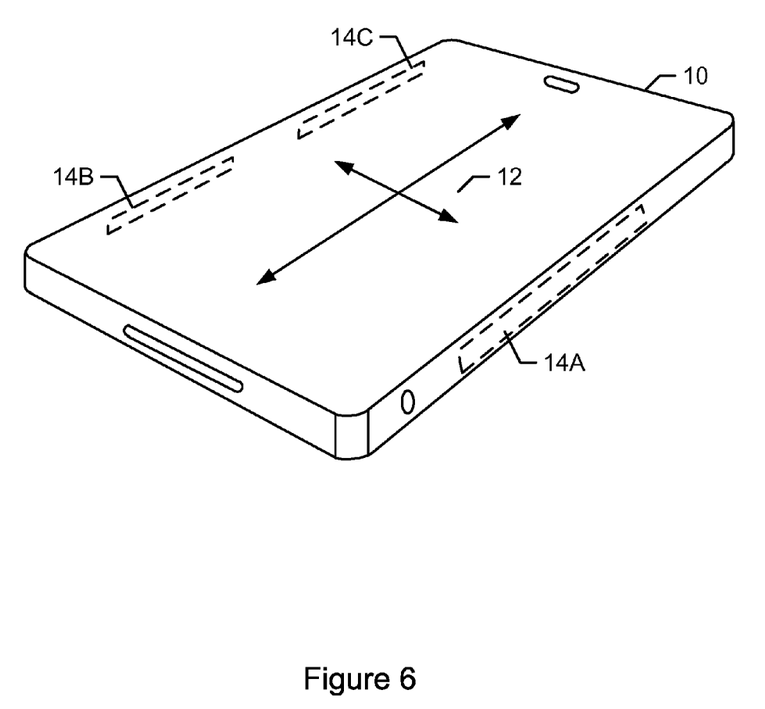
FIG. 6 illustrates an example mobile device.

FIG. 6 illustrates an example mobile device. This disclosure contemplates mobile device 10 taking any suitable physical form. As example and not by way of limitation, mobile device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 10 may have a touch screen 12 as an input component. In the example of FIG. 5, touch screen 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 6, one or more antennae 14A-B may be incorporated into one or more sides of mobile device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Figure 7:
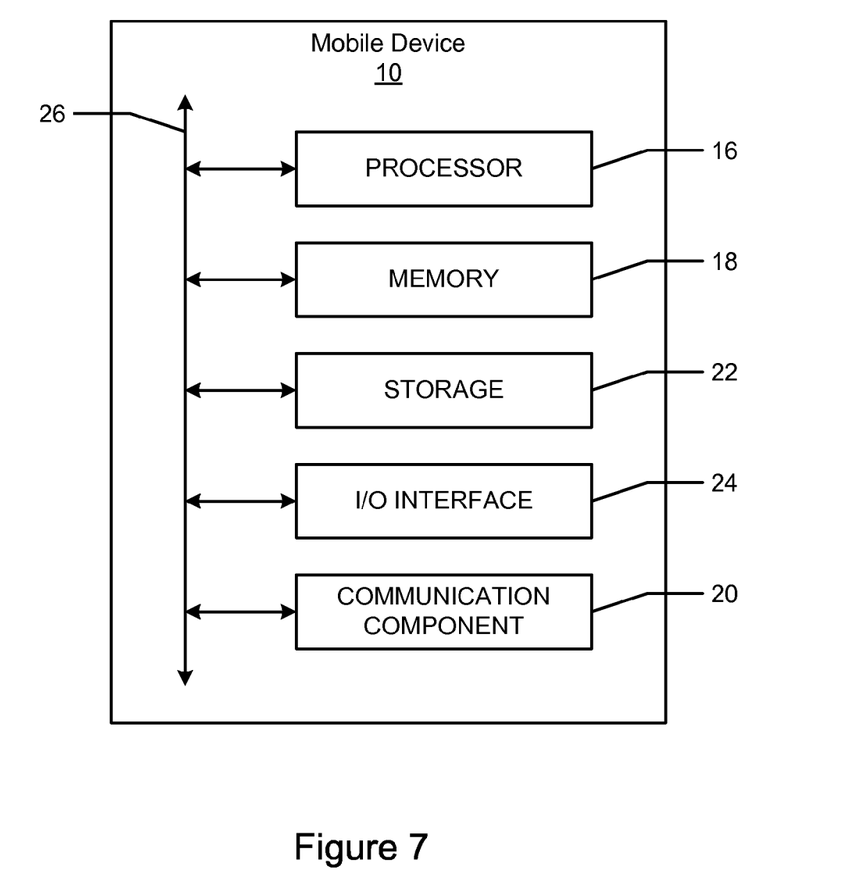
FIG. 7 illustrates example internal components of an example mobile device.

FIG. 7 illustrates example internal components of an example mobile device. Where appropriate, one or more mobile devices 10 may perform without substantial spatial or temporal limitation one or more steps of one or more methods described or illustrated herein. As an example and not by way of limitation, one or more mobile devices 10 may perform in real time or in batch mode one or more steps of one or more methods described or illustrated herein. In particular embodiments, one or more mobile devices 10 performs one or more steps of one or more methods described or illustrated herein. In particular embodiments, one or more mobile devices 10 provides functionality described or illustrated herein. In particular embodiments, software running on one or more mobile devices 10 performs one or more steps of one or more methods described or illustrated herein or provides functionality described or illustrated herein. Particular embodiments include one or more portions of one or more mobile devices 10.

In particular embodiments, mobile device 10 includes a processor 16, memory 18, storage 22, an input/output (I/O) interface 24, a communication component 20, and a bus 26. Although this disclosure describes and illustrates a particular mobile device having a particular number of particular components in a particular arrangement, this disclosure contemplates any suitable mobile device having any suitable number of any suitable components in any suitable arrangement. In particular embodiments, processor 16 includes hardware for executing instructions, such as those making up a computer program or application. As an example and not by way of limitation, to execute instructions, processor 16 may retrieve (or fetch) the instructions from an internal register, an internal cache, memory 18, or storage 22; decode and execute them; and then write one or more results to an internal register, an internal cache, memory 18, or storage 22.

In particular embodiments, processor 16 may include one or more internal caches for data, instructions, or addresses. This disclosure contemplates processor 16 including any suitable number of any suitable internal caches, where appropriate. As an example and not by way of limitation, processor 16 may include one or more instruction caches, one or more data caches, and one or more translation lookaside buffers (TLBs). Instructions in the instruction caches may be copies of instructions in memory 18 or storage 22, and the instruction caches may speed up retrieval of those instructions by processor 16. Data in the data caches may be copies of data in memory 18 or storage 22 for instructions executing at processor 16 to operate on; the results of previous instructions executed at processor 16 for access by subsequent instructions executing at processor 16 or for writing to memory 18 or storage 22; or other suitable data. The data caches may speed up read or write operations by processor 16. The TLBs may speed up virtual-address translation for processor 16. In particular embodiments, processor 16 may include one or more internal registers for data, instructions, or addresses. This disclosure contemplates a processor 16 including any suitable number of any suitable internal registers, where appropriate. Where appropriate, processor 16 may include one or more arithmetic logic units (ALUs); be a multi-core processor; or include one or more processors. Although this disclosure describes and illustrates a particular processor, this disclosure contemplates any suitable processor.

In particular embodiments, software executed by processor 16 may include an operating system (OS). The OS may include a kernel or any number of device drivers corresponding to one or more hardware components of mobile device 10. As an example and not by limitation, if mobile device 10 is a smartphone, then the OS may be a mobile operating system, such as for example, WINDOWS Phone, ANDROID, SYMBIAN, IOS, or BADA. In particular embodiments, one or more software applications may be executed on mobile device 10. In particular embodiments, the applications may be native applications installed and residing on mobile device 10. As an example and not by way of limitation, an application (e.g. GOOGLE MAPS) may display a map on a touch screen, search for addresses and businesses, or provide directions to a geographic location; a second application may provide remote access to email; a third application (i.e. a web browser) may enable the device user to browse and search the Internet; a fourth application may control a camera to take photos or record videos; and a fifth application may allow the device user to receive and initiate voice-over Internet Protocol (VoIP) or cellular network calls. The software applications may have a user interface (UI) and may implement one or more specific functionalities. The software applications may include one or more software modules implementing the specific functionalities. The executable code of the software applications may be stored in memory 18 or storage 22 of mobile device 10.

In particular embodiments, memory 18 includes main memory for storing instructions for processor 16 to execute or data for processor 16 to operate on. As an example and not by way of limitation, mobile device 10 may load instructions from storage 22 or another source (such as, for example, another mobile device 10) to memory 18. Processor 16 may then load the instructions from memory 18 to an internal register or internal cache. To execute the instructions, processor 16 may retrieve the instructions from the internal register or internal cache and decode them. During or after execution of the instructions, processor 16 may write one or more results (which may be intermediate or final results) to the internal register or internal cache. Processor 16 may then write one or more of those results to memory 18. In particular embodiments, processor 16 executes only instructions in one or more internal registers or internal caches or in memory 18 (as opposed to storage 22 or elsewhere) and operates only on data in one or more internal registers or internal caches or in memory 18 (as opposed to storage 22 or elsewhere).

One or more memory buses (which may each include an address bus and a data bus) may couple processor 16 to memory 18. Bus 26 may include one or more memory buses, as described below. In particular embodiments, one or more memory management units (MMUs) reside between processor 16 and memory 18 and facilitate accesses to memory 18 requested by processor 16. In particular embodiments, memory 18 includes random-access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 18 may include one or more memories, where appropriate. Although this disclosure describes and illustrates particular memory, this disclosure contemplates any suitable memory.

In particular embodiments, storage 22 includes mass storage for data or instructions. As an example and not by way of limitation, storage 22 may include a hard-disk drive (HDD), a floppy disk drive, flash memory, or a combination of two or more of these. Storage 22 may include removable or non-removable (or fixed) media, where appropriate. Storage 22 may be internal or external to mobile device 10, where appropriate. In particular embodiments, storage 22 is non-volatile, solid-state memory. In particular embodiments, storage 22 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 22 taking any suitable physical form. Storage 22 may include one or more storage control units facilitating communication between processor 16 and storage 22, where appropriate. Where appropriate, storage 22 may include one or more storages 22. Although this disclosure describes and illustrates particular storage, this disclosure contemplates any suitable storage.

In particular embodiments, I/O interface 24 includes hardware, software, or both providing one or more interfaces for communication between mobile device 10 and one or more I/O devices. Mobile device 10 may include one or more of these I/O devices, where appropriate. One or more of these I/O devices may enable communication between a user and mobile device 10. As an example and not by way of limitation, an I/O device may include a keyboard, keypad, one or more sensors, touch screen, microphone, monitor, mouse, printer, scanner, speaker, digital still camera, stylus, trackball, video camera, another suitable I/O device or a combination of two or more of these. This disclosure contemplates any suitable I/O devices and any suitable I/O interfaces 24 for them. Where appropriate, I/O interface 24 may include one or more device or software drivers enabling processor 16 to drive one or more of these I/O devices. I/O interface 24 may include one or more I/O interfaces 24, where appropriate. Although this disclosure describes and illustrates a particular I/O interface, this disclosure contemplates any suitable I/O interface.

In particular embodiments, communication component 20 includes hardware, software, or both providing one or more interfaces for communication (such as, for example, packet-based communication) between mobile device 10 and one or more other mobile devices 10 or one or more networks. As an example and not by way of limitation, communication component 20 may include a network interface controller (NIC) or network adapter for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile device 10 may communicate with an ad hoc network, a personal area network (PAN), a LAN, a WAN, a MAN, or one or more portions of the Internet or a combination of two or more of these. One or more portions of one or more of these networks may be wired or wireless. As another example, mobile device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile device 10 may include any suitable communication component for any of these networks, where appropriate. Communication component 20 may include one or more communication components, where appropriate. Although this disclosure describes and illustrates a particular communication component, this disclosure contemplates any suitable communication component.

In particular embodiments, bus 26 includes hardware, software, or both coupling components of mobile device 10 to each other. As an example and not by way of limitation, bus 26 may include a graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a serial advanced technology attachment (SATA) bus, a Video Electronics Standards Association local (VLB) bus, or another suitable bus or a combination of two or more of these. Bus 26 may include one or more buses 26, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a verification authority, receiving data uniquely identifying a particular one of a plurality of users to the verification authority and a request to access a shared device, the shared device being configured for use by at least the plurality of users;
by the verification authority, accessing a social graph of the particular user to determine whether one or more users in the social graph have previously accessed the shared device; and
by the verification authority, transmitting to a display of the mobile device information indicating which of the users in the social graph have previously accessed the shared device.

2. The method of claim 1, further comprising:
determining whether an account of the users in the social graph had been compromised subsequent to accessing the shared device, the account being on a social-networking system; and
displaying on the display a trust-based metric indicating a number of the users in the social graph with the account compromised subsequent to accessing the shared device.

3. The method of claim 2, wherein the trust-based metric comprises data from an extended social graph of the particular user with users not directly connected to the particular user.

4. The method of claim 2, further comprising determining whether the account had been compromised based on whether a password of the account has been reset within a pre-determined period of time subsequent to accessing shared device.

5. The method of claim 1, wherein displaying information indicating the users in the social graph that accessed the shared device comprising displaying an image of each of the users in the social graph that previously accessed the shared device.

6. The method of claim 1, wherein the shared device is registered with the verification authority.

7. The method of claim 1, wherein the data uniquely identifying the particular user to the verification authority comprises a digital credential transmitted by the mobile device, the digital credential uniquely identifying the particular user.

8. One or more computer-readable non-transitory storage media embodying logic configured when executed to:
- receive data uniquely identifying a particular one of a plurality of users to the verification authority and a request to access a shared device, the shared device being configured for use by at least the plurality of users;
- access a social graph of the particular user to determine whether one or more users in the social graph have previously accessed the shared device; and
- transmit to a display of the mobile device information indicating which of the users in the social graph have previously accessed the shared device.

9. The media of claim 8, wherein the logic is further configured to:
- determine whether an account of the users in the social graph had been compromised subsequent to accessing the shared device, the account being on a social-networking system; and
- display on the display a trust-based metric indicating a number of the users in the social graph with the account compromised subsequent to accessing the shared device.

10. The media of claim 9, wherein the trust-based metric comprises data from an extended social graph of the particular user with users not directly connected to the particular user.

11. The media of claim 9, wherein the logic is further configured to determine whether the account had been compromised based on whether a password of the account has been reset within a pre-determined period of time subsequent to accessing shared device.

12. The media of claim 8, wherein the logic is further configured to display an image of each of the users in the social graph that previously accessed the shared device.

13. The media of claim 8, wherein the data uniquely identifying the particular user to the verification authority comprises a digital credential transmitted by the mobile device, the digital credential uniquely identifying the particular user.

14. A method comprising:
- by an application on a mobile device of a particular one of a plurality of users, transmitting data uniquely identifying the particular user to a verification authority and a request to access a shared device, the shared device being configured for use by at least the plurality of users; and
- by the application, presenting on a display of the mobile device information from the verification authority indicating which of one or more users in a social graph of the particular user have previously accessed the shared device, the verification authority accessing the social graph to determine whether one or more of the users in the social graph have previously accessed the shared device.

15. The method of claim 14, further comprising displaying on the display a trust-based metric from the verification authority indicating a number of the users in the social graph having an account compromised subsequent to accessing the shared device, the verification authority determining whether an account of the users in the social graph had been compromised subsequent to accessing the shared device, the account being on a social-networking system.

16. The method of claim 15, wherein the trust-based metric comprises data from an extended social graph of the particular user with users not directly connected to the particular user.

17. The method of claim 15, wherein the verification authority determines whether the account had been compromised based on whether a password of the account has been reset within a pre-determined period of time subsequent to accessing shared device.

18. The method of claim 14, wherein displaying information indicating the users in the social graph that accessed the shared device comprising displaying an image of each of the users in the social graph that previously accessed the shared device.

19. The method of claim 14, wherein the shared device is registered with the verification authority.

20. The method of claim 14, wherein the data uniquely identifying the particular user to the verification authority comprises a digital credential uniquely identifying the particular user.

* * * * *